(12) United States Patent
Beretta

(10) Patent No.: US 7,603,945 B2
(45) Date of Patent: Oct. 20, 2009

(54) APPARATUS CONSTITUTED BY A PLURALITY OF DISPENSING ASSEMBLIES FOR AUTOMATICALLY PREPARING AND DISPENSING ESPRESSO COFFEE

(75) Inventor: Maurizio Beretta, Binasco Milano (IT)

(73) Assignee: Gruppo Cimbali S.p.A., Binasco Milano (IT)

( * ) Notice: Subject to any disclaimer, the term of this patent is extended or adjusted under 35 U.S.C. 154(b) by 0 days.

(21) Appl. No.: 11/604,860

(22) Filed: Nov. 28, 2006

(65) Prior Publication Data

US 2007/0119311 A1    May 31, 2007

(30) Foreign Application Priority Data

Nov. 28, 2005  (EP)  .................................. 05425839

(51) Int. Cl.
*A47J 31/00* (2006.01)
(52) U.S. Cl. ..................... 99/293; 99/302 P; 99/453; 99/323.1
(58) Field of Classification Search ............... 99/495, 99/485, 279–303, 323
See application file for complete search history.

(56) References Cited

U.S. PATENT DOCUMENTS 4,800,805 A * 1/1989 Mahlich et al. ............... 99/293
4,852,474 A * 8/1989 Mahlich et al. ............... 99/293
5,476,033 A * 12/1995 Locati .......................... 99/279
6,006,654 A * 12/1999 Pugh ............................. 99/293
6,901,848 B2 * 6/2005 Beretta ......................... 99/453

FOREIGN PATENT DOCUMENTS

EP    1 306 041 A    5/2003

* cited by examiner

*Primary Examiner*—Timothy F. Simone
(74) *Attorney, Agent, or Firm*—Nixon & Vanderhye, PC

(57) ABSTRACT

An apparatus constituted by a plurality of dispensing assemblies for automatically preparing and dispensing espresso coffee, each assembly of the plurality being of the type comprising a kinematic arrangement having a connecting rod and crank for moving the members responsible for preparing and dispensing the coffee in a prescribed operating sequence. The kinematic arrangement comprises a pair of connecting rods which are connected, at one end, to a respective crank and motor means for actuating at least one of the cranks. The dispensing assemblies are beside each other and the connecting rod of an assembly is provided with means which can function as the connecting rod of the adjacent assembly and transfer the rotational movement to the relevant crank so that all the dispensing assemblies are actuated at the same time by means of a single motor.

7 Claims, 3 Drawing Sheets

APPARATUS CONSTITUTED BY A PLURALITY OF DISPENSING ASSEMBLIES FOR AUTOMATICALLY PREPARING AND DISPENSING ESPRESSO COFFEE

BACKGROUND OF THE INVENTION

1. Field of the Invention

The present invention relates to an apparatus constituted by a plurality of dispensing assemblies for automatically preparing and dispensing espresso coffee, each assembly of the plurality being of the type comprising:

a cylinder member which has a chamber for containing a predetermined measure of coffee grounds, which has a closed base and which is provided with an open top, and a piston member, which are each provided either with an opening for dispensing the beverage prepared or, as an alternative with means for supplying heated and pressurized water to the cylinder member in the chamber for preparing the beverage;

said cylinder member and said piston being pivotable relative to each other between a position for charging and discharging the measure of coffee grounds, before and after the beverage is dispensed, respectively, and a position in which the cylinder member and the piston member are in alignment;

said piston member being movable in relative terms in order to close and open the chamber by moving into and out of the cylinder member;

a pair of mutually opposing and spaced-apart walls defining an intermediate space in which the cylinder member and the piston member are housed and supported;

a kinematic arrangement having a connecting rod and crank for causing said cylinder member or said piston member to swing and for moving either the piston member or the cylinder member in the prescribed operating sequence, that kinematic arrangement comprising a pair of connecting rods which are connected, at one end, to the sides of the piston member or of said cylinder member and, at the opposite end, to a respective crank which is supported by a respective wall of said opposing walls, the cranks being rotationally rigidly connected to each other;

and motor means for actuating at least one of the cranks and cam members for the angular displacement of the cylinder member and the piston member.

2. Description of Related Art

In accordance with the prior art, in completely automatic devices in which the operator does not carry out any manual operation, the assemblies for dispensing the coffee are normally provided with a cylinder body chamber whose volume is such to be able to also contain a quantity of coffee grounds equal to twice that necessary for preparing and dispensing a single coffee. However, if the diameter of the chamber remains constant, the quantity of two measures of coffee grounds necessarily leads to an increase in the thickness of the layer which will have to be passed through by the pressurized hot water which is introduced into the chamber when the request is made for a double coffee to be dispensed.

Since an essential condition for making a good espresso coffee is the constancy of the dispensing time which has to be maintained at approximately 25 seconds, irrespective of whether one measure or two measures of the beverage are being dispensed, the flow rate of the dispensing water must consequently be, when two measures of coffee are dispensed, double the flow rate used when a single measure is dispensed.

In the case of an automatic dispensing assembly of the type mentioned above, as is evident, the double measure of coffee grounds involves the formation of a double layer with respect to that which is present for a single measure. Consequently, given equal fineness of the grounds, in an identical chamber provided with a filter having holes of a given diameter, the same times for preparing the beverage cannot be maintained when varying the measure.

In order to overcome the differences in flow rate brought about by the use of one measure or two measures of coffee grounds, use is made, in accordance with a first solution of the prior art, of a quantity of coffee grounds greater than necessary for producing the single measure and a lesser quantity of coffee grounds when constituting the measure for two coffees, with the fineness of the grounds further being controlled at an intermediate granule size between one which optimizes the dispensing of a single measure and one which optimizes the dispensing of a double measure.

In accordance with another arrangement of the prior art, the problem presented by the automatic assemblies for dispensing coffee, there is used, downstream of the filter, a valve for limiting the flow rate whilst another arrangement in the prior art consists in varying the fineness of the grinding of the coffee as a function of the quantity of grounds which has to be used, as set out, for example, in EP 0 100 030. It is evident that the solutions proposed by the prior art are fundamentally based on a compromise to the detriment of the quality of the beverage.

In markets where the culture of espresso coffee is firmly established, since the above-described known solutions are not sufficient to ensure constant quality comparable with that obtained by a manually operated machine, in which adaptation to the conditions for dispensing one measure or two measures of coffee is carried out manually by changing the filter, the introduction of machines having automatic dispensing assemblies encounters serious difficulties.

BRIEF SUMMARY OF THE INVENTION

The object of the present invention is to overcome the disadvantages encountered in automatic assemblies for dispensing one measure or two measures of coffee by means of an apparatus comprising dispensing assemblies which are intended for different types of dispensing, in order to optimize the quality of the coffee dispensed, and which are connected together so as to bring about a reduction in both the space occupied and production costs.

The object is achieved by an apparatus constituted by a plurality of dispensing assemblies for automatically preparing and dispensing espresso coffee, each assembly of the plurality being of the type comprising:

a cylinder member which has a chamber for containing a predetermined measure of coffee grounds, which has a closed base and which is provided with an open top, and a piston member, which are provided, in alternative, either with an opening for dispensing the prepared beverage or with means for supplying heated pressurized water to the cylinder member in the chamber for preparing the beverage; said cylinder member and said piston being pivotable relative to each other between a position for charging and discharging the measure of coffee grounds, before and after the beverage is dispensed, respectively, and a position in which the cylinder member and the piston member are in alignment;

said piston member being movable in relative terms in order to close and open the chamber by moving into and out of the cylinder member;

a pair of mutually opposing and spaced-apart walls defining an intermediate space in which the cylinder member and the piston member are housed and supported;

a kinematic arrangement having a connecting rod and crank for causing said cylinder member or said piston member to swing and for moving either the piston member or the cylinder member in the prescribed operating sequence, that kinematic arrangement comprising a pair of connecting rods which are connected, at one end, to the sides of the piston member or of said cylinder member and, at the opposite end, to a respective crank which is supported by a respective wall of said opposing walls, the cranks being rotationally rigidly connected to each other;

and motor means for actuating at least one of the cranks and cam members for the angular displacement of the cylinder member or the piston member, wherein the dispensing assemblies are beside each other and are operationally connected to each other by means of bar-like connecting elements, each acting at the same time as a connecting rod for two adjacent assemblies.

BRIEF DESCRIPTION OF THE DRAWINGS

The invention will now be described in greater detail with reference to one practical embodiment, given purely by way of non-limiting example and illustrated with reference to the appended drawings, in which.

DETAILED DESCRIPTION OF THE INVENTION

With reference to the above-mentioned Figures, two spaced-apart side walls are designated 1 and 2 and form an intermediate space which is generally designated 3.

Those walls may be composed of moulded plastics material although, for the purposes of the present invention, other materials, for example, metal materials, may result suitable.

Figure 4:
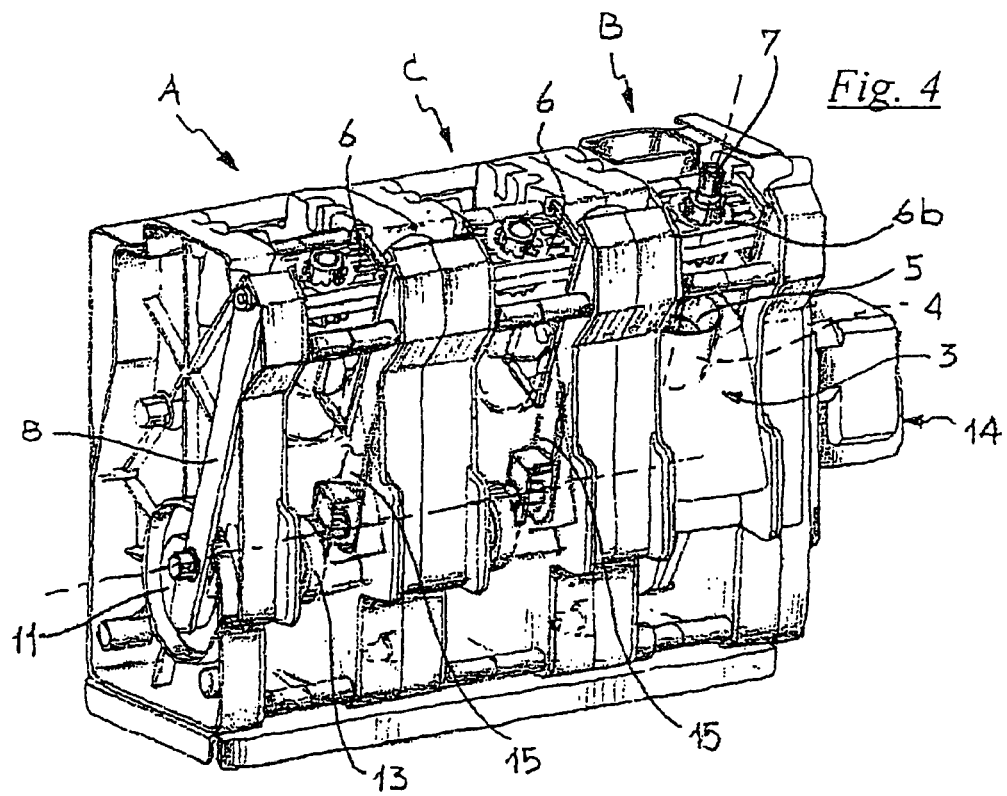
FIG. 4 shows a perspective view of an apparatus comprising three dispensing assemblies which are located beside each other and which are operationally connected to each other in accordance with the present invention.

The intermediate space 3 receives the operating members of the dispensing assembly which are known per se and which comprise a cylinder member 4 having a chamber 5 for containing a predetermined measure of coffee grounds, having a closed base which is provided with an opening for dispensing the prepared beverage, and being provided with an open top, as will be appreciated from FIG. 4. The same space 3 receives a piston member 6 which is provided with means 7 for supplying heated and pressurized water into the chamber 5 for preparing the beverage.

In a conventional manner, the cylinder member 4 and the piston member 6 can swing relative to each other between a position for charging and discharging the measure of coffee grounds, before and after the beverage is dispensed, respectively, and a position in which they are aligned with each other. Said cylinder member 4 and said piston member 6 can be moved, in a conventional reciprocating manner, in order to close and open the chamber 5 by moving into and out of the cylinder member 4. Each assembly is actuated by a kinematic arrangement having a connecting rod and crank and having cam members which bring about the relative displacements and the oscillating of the piston member 6 and of the cylinder member 4 in the prescribed operating sequence.

Figures 1, 2:
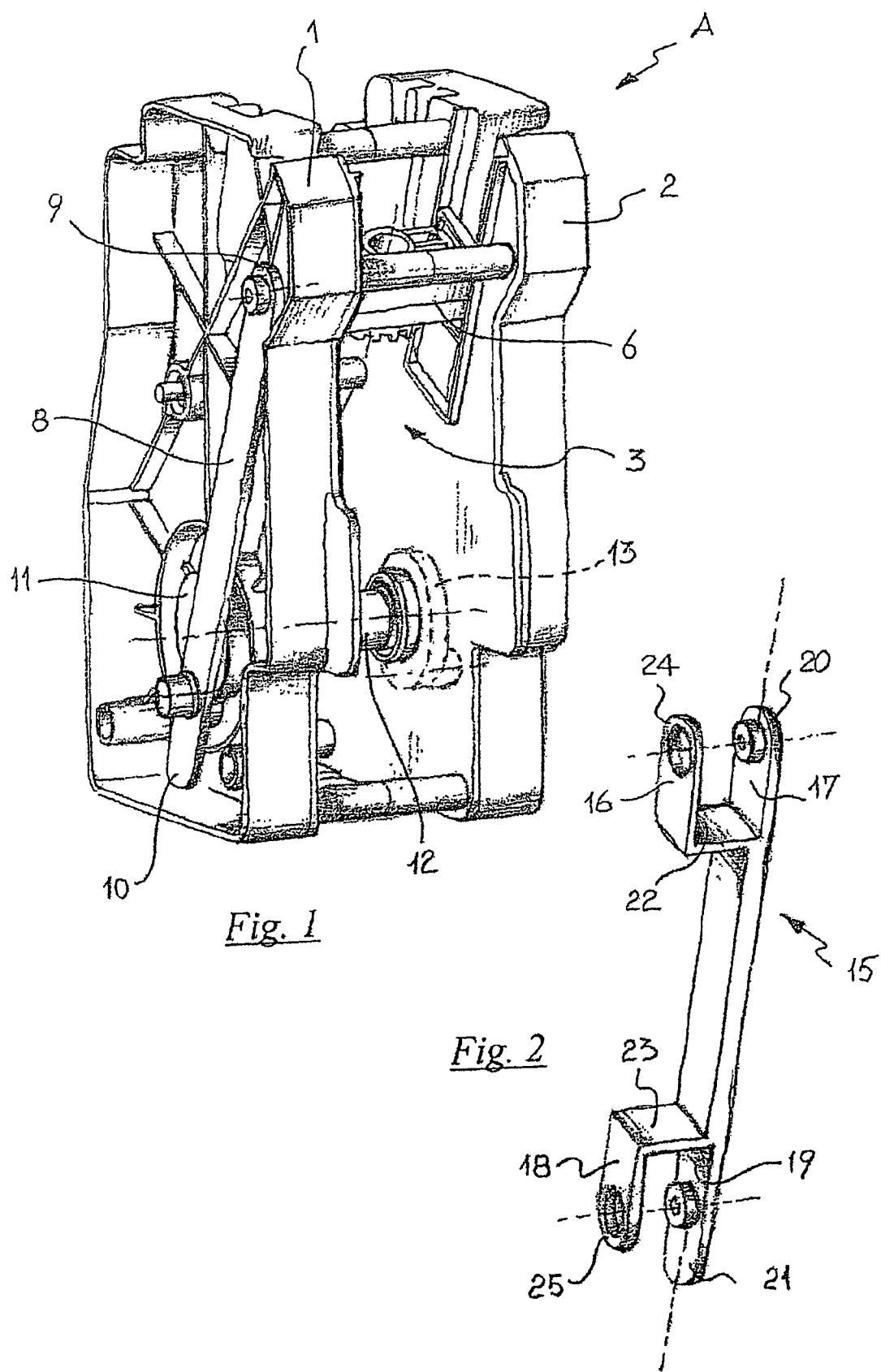
FIG. 1 shows a perspective schematic view of an automatic dispensing assembly in accordance with the invention.
FIG. 2 shows a perspective view of a first embodiment of the structure of a connecting rod of the kinematic arrangement for actuating the assembly which, in accordance with the invention, transfers the movement from a first dispensing assembly to an adjacent dispensing assembly.

As is visible from the Figures of the appended drawings, and in particular from FIG. 1 which illustrates an end dispensing assembly A of the apparatus, the kinematic arrangement comprises a connecting rod 8 which is connected, at the end 9 thereof, to one of the sides of said piston member 6 and, at the opposite end 10, to a respective crank 11. This latter is mounted on the shaft 12 which is supported by the opposing walls 1 and 2. The crank 11 which is positioned in the region of the walls 1 of the assembly is rigidly connected, by means of the shaft 12, to a crank 13 which is positioned in the region of the wall 2. It is therefore evident that, when a rotational movement is applied by a motor means to the crank 13, the crank 13 further transmits, via the shaft 12, the rotational movement to the crank 11.

Figure 3:
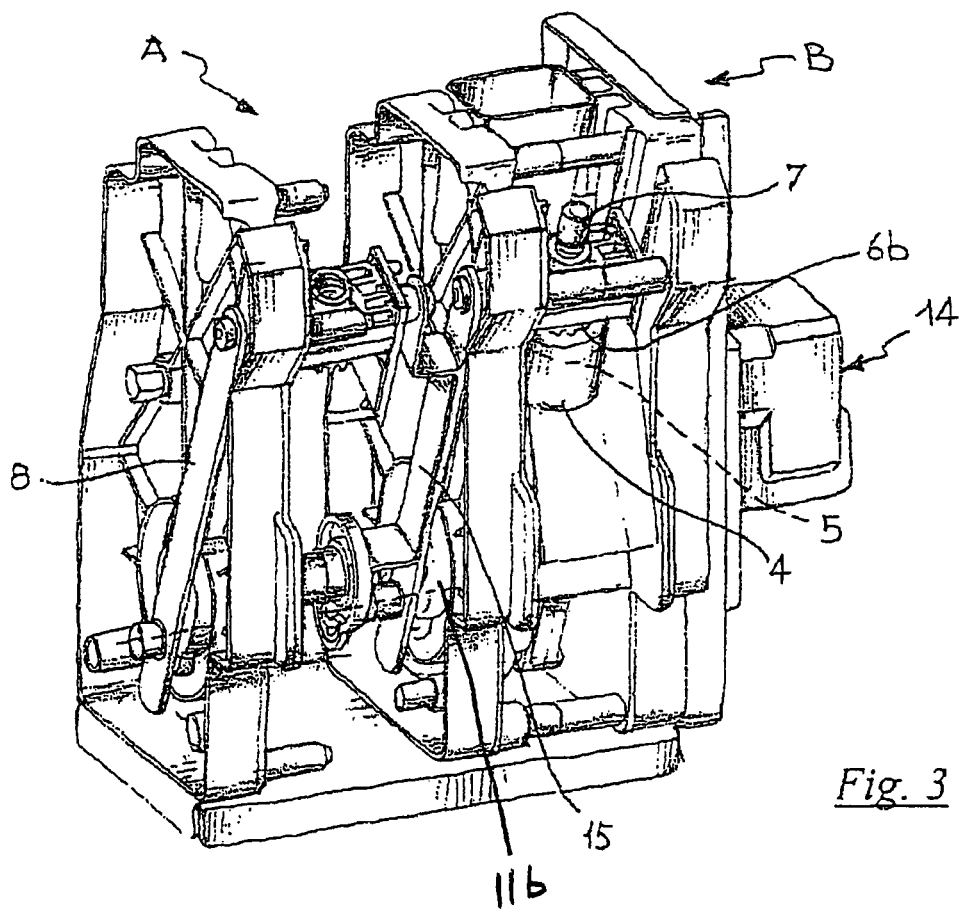
FIG. 3 shows a perspective view of an apparatus comprising two dispensing assemblies which are located one beside the other and which are operationally connected to each other in accordance with the present invention.

In accordance with the invention, in an apparatus configuration as illustrated in FIG. 3 also comprising, in addition to a dispensing assembly A, such as that in FIG. 1, a second dispensing assembly B which is structurally identical to assembly A and whose kinematic arrangement having a connecting rod and crank is actuated by an electric motor 14, optionally with a step-down arrangement being connected, the transmission of the movement from the kinematic arrangement of assembly B to that of assembly A is effected by means of a special bar-like connecting element which, in one embodiment thereof, is constituted by the connecting rod 15 illustrated in FIG. 2.

That connecting rod 15 is provided with a first end piece 16 which is rigidly fixed to the end portion 17 of the connecting rod and a second end piece 18 which is rigidly fixed to the end portion 19 of the same connecting rod. Both the end pieces 16 and 18 extend parallel with the longitudinal axis of the connecting rod 15 as far as the respective ends 20 and 21 of the rod. Furthermore, both the end pieces 16 and 18 are spaced apart from the connecting rod 15 by means of respective spacer elements 22 and 23 by a predetermined distance in a direction perpendicular to the longitudinal axis of the connecting rod 15.

The end pieces 16 and 18 are provided with means, indicated at 24 and 25, for being connected, one to the piston member of the assembly A and the other to the crank 13 of the same assembly A, respectively.

However, the connecting rod 15, at the ends 20 and 21 thereof, is connected to the piston member 6b and the crank 11b of the assembly B, respectively.

Figure 5:
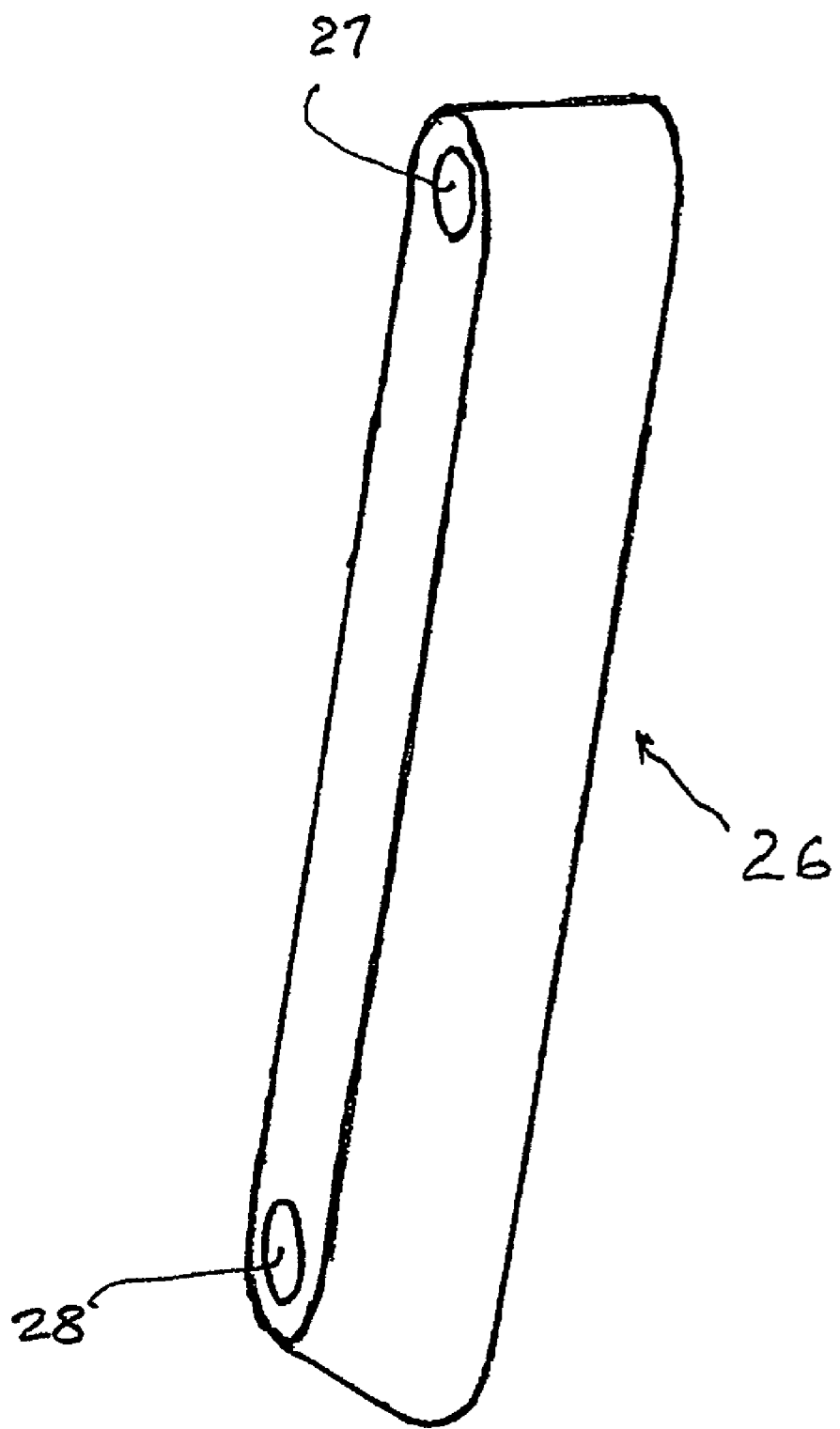
FIG. 5 shows a perspective view of a second embodiment of the connecting rod of FIG. 2.

In accordance with a second embodiment, the connecting element for transferring the movement from a first dispensing assembly to an adjacent assembly is in the form of a bar 26, as illustrated in FIG. 5. That bar 26, at the ends thereof, comprises the means 27 and 28 which correspond to those designated 24 and 25 on the connecting rod 15, performing the same function. For that purpose, the bar 26 has a thickness which is substantially equal to the thickness of the wall 2 of a dispensing assembly.

Therefore, the connecting rod 15 or the bar 26, with the specific structure thereof, simultaneously act as the left-hand connecting rod, with reference to FIG. 3, for the dispensing assembly B, and as the right-hand connecting rod for the dispensing assembly A, which is actuated by the same, single motor 14 which is associated with the dispensing assembly B.

In accordance with the invention, therefore, the dispensing assembly A can be, for example, provided with a dispensing chamber which is optimized in order to dispense a single measure of coffee and the assembly B can be provided with a chamber which is optimized in order to dispense two measures, and both the assemblies can be actuated by a single motor 14 having suitable power. Therefore, there can be dispensed, in an optimum manner and at the same time, for example, a single coffee, by charging only assembly A, or only two coffees, by charging only assembly B, or there can further be dispensed three measures of coffee by charging the chambers of both assemblies A and B.

Naturally, the combination of the assemblies which form the apparatus may vary as required. For example, with reference to FIG. 4, assemblies A and B may also be supplemented by an intermediate assembly C having a chamber which is optimized for one measure or for two measures of coffee, extending the performance range of the automatic apparatus and always providing high-quality beverages.

I claim:

1. An apparatus constituted by a plurality of dispensing assemblies for automatically preparing and dispensing espresso coffee, each assembly of the plurality comprising:
   a cylinder member which has a chamber for containing a predetermined measure of coffee grounds, which has a closed base and which is provided with an open top, and a piston member, which are provided, in alternative, either with an opening for dispensing the prepared beverage or with means for supplying heated pressurized water to the cylinder member in the chamber for preparing a beverage; said cylinder member and said piston being pivotable relative to each other between a position for charging and discharging a measure of coffee grounds, before and after a beverage is dispensed, respectively, and a position in which the cylinder member and the piston member are in alignment;
   said piston member being movable to close and open the chamber by moving into and out of the cylinder member;
   a pair of mutually opposing and spaced-apart walls defining an intermediate space in which the cylinder member and the piston member are housed and supported;
   a kinematic arrangement having a connecting rod and crank for causing said cylinder member or said piston member to swing and for moving either the piston member or the cylinder member in a prescribed operating sequence, said kinematic arrangement comprising a pair of connecting rods which are connected, at one end, to the sides of the piston member or of said cylinder member and, at the opposite end, to a respective crank which is supported by a respective wall of said opposing walls, the cranks being rotationally rigidly connected to each other;
   and motor means for actuating at least one of the cranks for the angular displacement of the cylinder member or the piston member, wherein the dispensing assemblies are beside each other and are operationally connected to each other by bar-like connecting elements, each acting at the same time as a connecting rod for two adjacent assemblies;
   wherein the bar-like connecting element comprises a connecting rod of an assembly, which is provided with means which can function as the connecting rod of the adjacent assembly and transfer the rotational movement to the relevant crank so that all the dispensing assemblies may be actuated at the same time by means of a single motor to dispense coffee from the dispensing assemblies in a predetermined optimum time to ensure the quality of the coffee.

2. An apparatus according to claim 1 wherein the means of the connecting rod of a dispensing assembly which can function as the connecting rod of the adjacent assembly comprise a first end piece and a second end piece which are rigidly fixed to the connecting rod in the region of the end portions thereof, the end pieces extending parallel with the longitudinal axis of the connecting rod as far as the respective ends thereof and being spaced apart by a predetermined distance in a direction perpendicular relative to said longitudinal axis, there being provided means for connecting one of the end pieces to the piston member and means for connecting the other end piece to the crank, respectively.

3. An apparatus according to claim 2, wherein the distance by which the first and second end pieces are spaced apart from the relevant connecting rod corresponds substantially to the thickness of the wall of the adjacent dispensing assembly, to the crank and the piston member of which the movement is transmitted by the respective end pieces of the connecting rod.

4. An apparatus according to claim 1, wherein the bar-like connecting element comprises a bar which is provided with a thickness substantially equal to the thickness of the wall of a dispensing assembly.

5. An apparatus according to claim 1, wherein the chamber of the cylinder member of each dispensing assembly is constructed to contain coffee grounds in such a quantity as to constitute a multiple of the measure for a single espresso coffee.

6. An apparatus according to claim 1, wherein the chamber of the cylinder member of each dispensing assembly is constructed to contain coffee grounds in such a quantity as to constitute the measure for a single espresso coffee.

7. An apparatus according to claims 1, wherein the chamber of the cylinder member of at least one of the dispensing assemblies is constructed to contain coffee grounds in such a quantity as to constitute two measures for espresso coffee.

* * * * *